Patented May 22, 1951

2,554,259

UNITED STATES PATENT OFFICE 2,554,259

OXIDIZED POLYPROPYLENE AND ITS USE AS PLASTICIZER

Louis A. Mikeska, Westfield, and David W. Young, Roselle, N. J., assignors to Standard Oil Development Company, a corporation of Delaware No Drawing. Application July 29, 1948, Serial No. 41,408

6 Claims. (Cl. 260—451)

The present invention relates to non-volatile esters. More particularly, it relates to the preparation of polyesters by the oxidation of polymerized propylene and to the use of such polyesters as plasticizers for a wide variety of rubbery or resinous substances, vinyl type resins being susceptible of especially favorable improvement thereby.

An object of the present invention is to provide the art with novel polyesters useful as plasticizers and to devise a method of preparing such polyesters, particularly polyesters of light color and free from objectionable odors. More specific objects will become apparent from the subsequent description.

It has been known that high-molecular weight hydrocarbons, either liquid or solid, including for instance polymerized isobutylene, copolymers of isobutylene with diolefins, and polymers of diolefins can be oxidized. However, as taught in U. S. Patent 2,128,574, for instance, such oxidation process generally resulted in degradation of the hydrocarbon material into dark-colored masses or in reduction of the molecular size of the material subjected to oxidation. Thus, for instance, if natural or synthetic rubbery elastomers or tough resins of a hydrocarbon nature are oxidized substantially, they change into brittle resins of lower molecular weight and eventually into sticky liquids. Similarly, liquid polymers tend to become degraded by oxidation changing finally into malodorous and discolored substances which are apparently in the nature of acids or aldehydes.

The unexpected discovery has been made now that polymerized propylene, instead of becoming degraded, can form highly useful polyesters on oxidation, said polyesters usually having a molecular weight substantially higher than the original polymer, indicating that the polyesters are formed by a condensation reaction. The condensation mechanism of the oxidation reaction appears to be confirmed especially by the observation that considerable amounts of water are split out during the oxidation, and especially in its later stages.

It is known that propylene can be polymerized with Friedel-Crafts catalyst under various conditions to yield polymeric products. For instance, such polymerization can be carried out at atmospheric pressure in an apparatus comprising a two-liter glass flask equipped with a mechanical stirrer, a vertical reflux condenser kept at $-20°$ to $+50°$ C. (to retain $C_6$ hydrocarbons), and an inlet tube through which a stream of propylene feed is introduced beneath the surface of the liquid hydrocarbon in the reactor flask. When boron fluoride is used as catalyst it is preferred to feed it to the reactor in admixture with the propylene feed, whereas in the case of solid Friedel-Crafts catalyst, such as aluminum chloride or aluminum bromide or the like, the entire amount of catalyst may be added to the reactor at once and only propylene is fed through the inlet tube. Normal heptane or similar inert hydrocarbon may also be added to the reactor as a solvent at the beginning of each run. The polymer as formed remains in the reactor during the entire run.

Runs carried out in the above described apparatus under different specified conditions are summarized in Table I.

TABLE I

*Polymerization of gaseous propylene at atmospheric pressure in a batch reactor*

[Feed, 95% Propylene. Solvent-n-heptane]

| Run No | 1 | 2 | 3 | 4 | 5 | 6 | 7 |
|---|---|---|---|---|---|---|---|
| Catalyst | $AlBr_3$(26 g.) | $AlCl_3$(20 g.) | | $BF_3$ | $BF_3$ | $BF_3$ | $BF_3$ |
| Additive-Promoter | | | | (1) | (1) | (2) | (2) |
| Temperature, °C | 25 | 25 | 50 | 30 | 50 | 30 | 50 |
| Feed Rates: | | | | | | | |
|   Propylene, L /Hr.[3] | 50 | 45 | 60 | 45 | 47 | 32 | 44 |
|   $BF_3$, L /Hr.[3] | | | | 3 | 6 | 4 | 4 |
| Conversion to Polymer, percent | >80 | >80 | >80 | 59 | 18 | 48 | 65 |
| Length of Run (hrs.) | 3 | 3.2 | 4.3 | 3.3 | 7 | 8 | 8 |
| Product Distribution (Vol. percent), B. P. @ 760 mm., °C.: | | | | | | | |
|   $C_9$ 125–165 | | | | 0 | | 0 | 0 |
|   $C_{12}$ 165–220 | | | | 10 | | 0 | 0 |
|   $C_{15}$ 220–280 | | | | 50 | (4) | 5 | 15 |
|   $C_{18}$ 280–320 | | | | 25 | | 65 | 55 |
|   $C_{21}$ 320–350 | | | | 10 | | 15 | 22 |
|   $C_{24}$ 350–380 | | | | 5 | | 15 | 8 |
|   $C_{27}+$ 380 | 100 | 100 | 100 | | | | |

[1] 26 g. of dichloroethylether ($Cl-CH_2-CH_2-O-CH_2-CH_2-Cl$).
[2] 10 g. of $H_2O$. (In a completely dry system $BF_3$ failed to catalyze the polymerization of propylene.)
[3] Measured as a gas.
[4] Not analyzed.

The data show that aluminum chloride and aluminum bromide are active catalysts by themselves. Conversions greater than 80% were realized at temperatures of 25 and 50° C. The average molecular weight of the very viscous polymers obtained in runs 1, 2, and 3 was between about 1500 and 12,000, and when subjected to vacuum distillation these polymers gave only traces of materials distilling below 380° C. (corrected to atmospheric pressure) which is the initial boiling range of $C_{27}$ olefins.

When boron fluoride was employed as the catalyst at atmospheric pressure in the temperature range of 30 to 50° C., a small amount of a polar modifier such as water or an ether was required to obtain appreciable reaction. In the $BF_3$-catalyzed runs 4, 5, 6 and 7 the conversion of propylene varied from 18 to 65 weight percent. The products from these $BF_3$ polymerization runs were considerably lighter than those from the aluminum halide runs and consisted essentially of $C_{12}$-$C_{24}$ hydrocarbons, with $C_{18}$ hydrocarbons predominating in the runs in which water was used as promoter, whereas the $C_{15}$ hydrocarbon fraction predominated in the dichlorethylether-promoted run.

Alternatively, known high pressure methods may be used for preparing the polypropylene, operating for example at pressures ranging from 10 lbs. per sq. inch to 1,000 lbs. per sq. in. or higher, and at temperatures usually ranging from 100 to 250° C. In these high-pressure runs catalysts also may be employed, gaseous boron fluoride being able to cause virtually complete conversion of propylene in reaction times as short as two minutes to one hour.

Still other methods of preparing polypropylene may be employed for the purposes of the present invention which requires merely that the polypropylene stock have an average molecular weight corresponding to at least fifteen carbon atoms per molecule, preferably 25 to 200 carbon atoms per molecule, or an average molecular weight between about 200 to 10,000, preferably between 300 and 5,000. Furthermore, it is advantageous if the polypropylene to be used in the present invention is predominantly in the nature of a branched chain polymer having a number of tertiary carbon atoms, i. e., of a nature corresponding to the products described in Table I above. The presence of tertiary olefins can be determined qualitatively by bromate-bromide unsaturation analyses which tend to be inconsistent among themselves when tertiary olefins are present in the hydrocarbon mixture tested, or by the determination of the iodine-mercuric acetate unsaturation values, which in the case of tertiary olefins are in better agreement with the distillation data when it is assumed that three rather than two atoms of iodine are consumed "per double bond," the divergence from the theoretical value being possibly due to some displacement of hydrogen by iodine at the tertiary carbon atom.

It has been discovered that polypropylene of the above described character can be readily oxidized by blowing with air or oxygen at 140 to 200° C., preferably between 155 to 185° C., for a period of about 1 to 24 hours. The presence during oxidation of a hydrocarbon soluble peroxide such as benzoyl peroxide, t-butyl peroxide, stearyl peroxide or the like appears to accelerate the desired reaction. The novel oxidized material consists predominantly of polyesters, although other oxidation products such as acids, alcohols, aldehydes, ketones, hydroxy acids and the like are also present in varying small amounts depending on the oxidation temperature. This course of the oxidation reaction is quite unexpected, as relatively little, if any, of the feed material is degraded into low molecular weight products when operating at temperatures below 200° C. Instead the oxidation reaction below 200° C. apparently causes the formation of carboxyl and hydroxyl groups and is followed by esterification or condensation so that the oxidized product has usually a higher molecular weight than the polypropylene feed. It was further observed that at temperatures below about 155° C. the esterification lags somewhat behind the oxidation reaction, thereby giving rise to a more acid product, whereas above 200° C., the oxidized polymer tends to become more colored and more highly acetic.

It has been discovered that particularly useful light-colored and relatively odor-free polyesters can be obtained by the oxidation of a carefully selected polypropylene fraction, particularly a fraction boiling below about 250° C. at 3 mm. Hg pressure, preferably between 210 and 235° C. at 3 mm. Hg pressure, and having a molecular weight between about 750 and 900.

EXAMPLE 1

A large glass tube sealed at one end, and equipped with an inlet tube for oxygen, was charged with 80 gms. of polypropylene of about 27 carbon atom average chain length. Oxygen was then passed through the liquid at 175°–180° C. for 2½ hours. 12.5 ml. of water and 3 ml. of oil were caught in the water trap.

The oxidized product consisted of a very viscous oil only slightly yellower than the original water-white polypropylene, and was freely soluble in oxygenated solvents such as ethyl alcohol, acetone, methyl ethyl ketone and the like.

Th product contained 75.29% carbon, 11.91% hydrogen and 12.80% oxygen. It had a saponification number of 130 and an acid number of 55.4, and an average molecular weight of about 540.

The polyesters of polypropylene are effective plasticizers for various resinous or rubbery materials such as vinyl resins (polyvinyl chloride, polyvinyl acetate, and interpolymers or mixtures thereof), phenolics, "Perbunan" or GR-A rubber (emulsion copolymers of a 60 to 85% of butadiene with 40 to 15% of acrylonitrile), "Butyl" or GR-I rubber (low temperature copolymer of 0.5 to 30% of isoprene or a $C_4$ to $C_6$ diolefin with 99.5 to 70% of isobutylene), etc. Furthermore, these polyesters can be used as addition agents for ester-type lubricants to increase their load carrying capacity and viscosity and to increase their viscosity index. When chlorinated, or chlorinated and condensed with phosphorus pentasulfide, the novel polyesters of polypropylene also show promise as addition agents for extreme pressure lubricants.

The following specific examples illustrate the unusual effectiveness of the novel polyesters as plasticizers for various resinous and rubber-like materials.

EXAMPLE 2

Oxidized polypropylene having a combined oxygen content of 13 weight percent and prepared on large scale according to the method of Example 1 was used to plasticize Vinylite (VYNW) which is a high molecular weight, brittle copolymer of 95% vinyl chloride and 5% of vinyl acetate. The vinyl resin was compounded on a rubber mill at 280° F. according to the formulas given in Table II below and when so compounded showed the excellent properties also summarized in Table II, especially when used as a complementary plasticizer as in compound B.

TABLE II

| | A | B |
|---|---|---|
| Vinylite (VYNW) grams | 25 | 25 |
| Basic Lead Carbonate do | 1 | 1 |
| Stearic Acid do | 0.5 | 0.5 |
| Oxidized Polypropylene do | 12.5 | 5 |
| Dioctyl Phthalate do | | 7.5 |
| Tensile (lbs./sq. in.) | 920 | 2,300 |
| Elongation (Per Cent) | 25 | 140 |
| Shore Hardness (Instant) | 86 | 78 |
| Crescent Tear (R. T.) | 285 | 388 |
| Low Temp. Break Point (By A.S.T.M. D746-44T) °F | | 40 |

EXAMPLE 3

Another type of useful plasticizer was obtained by further modifying oxidized polypropylene by reacting it with an alcohol according to the following procedure.

A three-way flask equipped with condenser was charged with 68 grams of oxidized polypropylene similar to that used in Example 2 and with 150 cc. of absolute ethyl alcohol. To this was added about 1 gram of p-toluene sulfonic acid monohydrate. The mixture was then refluxed for 10 hours, the product mixture was thereafter cooled, poured into water, extracted with ether (10-1), washed with water and dried over sodium sulfate. Ether and water were finally removed on the steam bath. Residue weight was 66 grams of dark red oil, somewhat less viscous than the starting material.

As some water came off on the ester reaction, it can be concluded that some of the acid of the oxidized polypropylene reacted with the ethanol to form a modified polyester. This new ethyl ester of a polyester of oxidized polypropylene was quite compatible with GR-I, GR-S, GR-A rubber, resinous copolymers of isobutylene with styrene prepared in accordance with the teachings of U. S. Patent 2,274,749, solid polymers of butadiene, ethylene, butene and polyamides (Norelac). Qualitative extrusion tests proved that the ethyl ester of the polyester was a good plasticizer in synthetic polymers or elastomers when the concentration of plasticizer was from 5 to 25%.

EXAMPLE 4

Comparative test blends of hereinbefore identified VYNW resin with 35% by weight of various plasticizers have been prepared by compounding on a rubber mill at 280° F.

TABLE III

| Plasticizer | Oxidized Polypropylene | Di-n-Octyl Phthalate | Di-Butyl Sebacate |
|---|---|---|---|
| Tensile (p. s. i.) | 2,600 | 2,680 | 2,080 |
| Ultimate Elongation, Per Cent | 250 | 330 | 340 |
| 100% Modulus (p. s. i.) | 1,800 | 1,040 | 640 |
| Bend Brittle Pt., °C | −6 | −32 | −65 |
| Volatility (Per Cent Weight Loss) (6 x 6 x .075" pads held at 85° C. for 48 hours) | 0.1 | 1.2 | 9.6 |
| Flammability (A.S.T.M., D568-41T): | | | |
| Per Cent Burned | 6 | 100 | 100 |
| Time (seconds) (0.010 inch film and N/C fuse) | 10 | 19.1 | 17 |

The unusually low heat loss obtained with the oxidized polypropylene is to be noted, being of the order of a small fraction of 1%, whereas the corresponding heat loss with the other organic plasticizers was 1.2 and 9.6 respectively. The low flammability is likewise remarkable for an organic material.

The oxidized propylene polymer used in the above example was prepared from a polypropylene having a Staudinger molecular weight of 2,700 (average carbon chain length of about $C_{63}$). This polymer was made at −78° C. with Dry Ice internal refrigerant. A saturated solution of $AlBr_3$ in methyl chloride (about 15 g./100 ml.) of catalyst was used. The propylene feed was 87% pure, the major impurity being propane. 25 ml. of catalyst solution was used to polymerize 400 ml. of propylene at −78° C. After the polymerization reaction the polymer was end washed with water and dried. Yield of polymer on propylene was 86% by weight. 100 ml. of this polymer were oxidized in a 250 ml. Pyrex beaker at 180° C. with an oxygen gas addition rate of about 1 cu. ft. per hour. The time of run with oxygen was 3 hours. Yield of polymer (polyester by weight on starting polymer oil) was 71% and the resulting polyester had a viscosity at 70° C. of 2.8 stokes and a viscosity at 20° C. of 51 stokes, and a molecular weight of about 4000 which is about 50% higher than the molecular weight of the original propylene polymer.

EXAMPLE 5

An oily propylene polymer having a molecular weight of 4800 (Staudinger) was prepared in the presence of aluminum chloride according to the method which was outlined in connection with run 2 of Table I, supra. Oxygen gas was blown through the oily polymer at 180° C. for about two hours at a rate of 1 cu. ft. per hour and the resulting light-yellow, viscous product was found to be a polyester containing 18% oxygen by weight. The oxidized polypropylene was used as a plasticizer in subsequent Examples 6, 7, and 8.

EXAMPLE 6

100 grams of Vinylite (VYNW) was mixed in a Pyrex beaker with 3 grams of basic lead carbonate, 1.5 g. of stearic acid and 50 g. of oxidized polypropylene. The mixture was made at room temperature. After this the contents of the beaker were placed on a rubber mill at 290° F. and mixed well for fifteen minutes. The resulting elastic, plastic product was then removed from the mill and evaluated. Results are recorded in Table IV.

TABLE IV

*Physical properties of Vinylite-oxidized polypropylene blend stabilized with basic $PbCO_3$*

| | |
|---|---|
| Tensile, lbs./sq. inch | 2140 |
| Ultimate elongation, percent | 180 |
| Shore hardness, instant | 88 |
| Crescent tear, lbs./sq. in | 270 |
| Color of product | Light yellow |
| Odor | Very slight |
| Light aging—150 hrs. in ultraviolet light | Very good |

The results in Table IV show the value of oxidized polypropylene as a plasticizer for Vinylite (VYNW). Light-colored, elastic, rubber-like products can be made therefrom when oxidized polypropylene is used as the plasticizers.

EXAMPLE 7

Oxidized polypropylene was used as a mill release agent for Perbunan (35% combined acrylonitrile)-VYNW blends. In this work 100 parts of VYNW copolymer were placed on a rubber mill at 280° F. and mixed with three parts basic PbCO₃. 50 parts of Perbunan-35 having a 2-minute Mooney viscosity of 90 were then added to the resulting mixture at 280° F. and finally 1.5 g. of oxidized polypropylene were added to the rubber-resin mixture which was then held on the rubber mill for 15 minutes at about 280° F. at a tight mill setting. After this the product was easily removed from the mill. No mill sticking was noted, indicating that the novel oxidized polypropylene serves as an effective mill release agent.

EXAMPLE 8

In this example, Perbunan-35 and the oxidized polypropylene identified in the preceding example were used to plasticize Vinylite as shown in Table V.

TABLE V

*Formula*

|  | Parts by weight. |
|---|---|
| Vinylite VYNW | 100 |
| Basic lead carbonate | 3 |
| Perbunan-35 | 50 |
| Oxidized polypropylene | 12 |

*Properties*

| | |
|---|---|
| Specific gravity | 1.291 |
| Tensile, lbs./sq. in | 2740 |
| 100% modulus | 2320 |
| 200% modulus | 2470 |
| Ultimate elongation, percent | 300 |
| Shore hardness, instant | 94 |
| Shore hardness, 5 secs | 92 |
| Shore hardness, 10 secs | 92 |
| Crescent tear at room temperature, lbs./sq. in | 832 |
| Loss in weight, 3 days at 250° F., percent | 0.085 |

The product listed in Table V is of particular interest as the plasticizer used consists exclusively of Perbunan and oxidized polypropylene polymers. Therefore, only a very slight loss in weight occurs when the finished plastic is heated for 3 days at 250° F. At the same time, the product has elastic properties with good elongation and good crescent tear values.

EXAMPLE 9

A particularly excellent product was obtained by oxidizing a specific fraction of the so-called U. O. P. polymer bottoms, the latter being the high-boiling fraction of the product obtained in the well-known U. O. P. polymerization process for the production of gasoline from C₃ cracked hydrocarbon fractions by polymerization at about 440° F. and at about 1000 lbs. per sq. inch pressure in the presence of a catalyst consisting essentially of phosphoric acid deposited on a kieselguhr clay support. For the purposes of the present invention the U. O. P. bottoms were fractionally distilled under 3 mm. Hg pressure so that 56% of the polymer distilled at 210°–235° C. and 28% at 235°–273° C., leaving 16% of a dark viscous oil as residue.

100 grams of the aforementioned polymer fraction boiling between 210° and 235° C. (molecular weight about 880) were oxidized by adding thereto 2 grams of cumene hydroperoxide (50% active ingredient) and heating the resulting mixture to 140–150° C. while blowing with oxygen until 35 cc. of water and 20 cc. of oil distillate were collected in the water trap.

The oxidation product weighed 88 grams and consisted of a light colored viscous oil having the following analysis:

Acid No. = 0.103 cg./gm.
Saponification No. = 0.294 cg./gm.
Hydroxyl No. = 000
Carbonyl No. = 0.083 cg./gm.

EXAMPLE 10

The novel oxidized polypropylene also has been found useful as a starting material in the preparation of extreme pressure lubricant additives. In this work 40 grams of oxidized polypropylene (12% oxygen, molecular weight about 3,500) was dissolved in 250 ml. of CCl₄ and chlorinated in this solution by passing chlorine gas therethrough at the rate of 2 cu. ft. per hour for 1 hour in the presence of light. At the end of the run, isopropyl alcohol 99% was added to precipitate the polymer which was then separated, washed with water and dried. Analysis of the product showed that the soluble chlorinated polyester contained 24.07% Cl.

The chlorinated product was placed in a three-way flask equipped with a stirrer and a return condenser. 36 gms. of the chlorinated product described above were placed in the flask and to this was then added 150 cc. of dioxane and 9 gms. of phosphorus pentasulfide. The mixture was then refluxed for 3 hours with rapid stirring. The reaction was very rapid as in ½ hour all the phosphorus pentasulfide dissolved. The resulting product was cooled and filtered, but no precipitate was found. The filtrate was poured into water whereupon the product was extracted with ether, then the product was washed with water, dried over calcium sulfate and residual solvent has removed on a steam bath. The product was tested for sulfur and phosphorus and was found to contain 5.54% sulfur and 1.48% phosphorus. This product was a very good extreme pressure agent, as indicated by the fact that a 2% solution of this product in mineral oil (having a viscosity index of 112; 43 S. S. V. at 210° F.), carried all weights in the Standard Almen Machine Test.

From the foregoing description and specific examples, it may be seen that the invention relates to a new oxygenated oil and a method of preparing it by oxidizing a polymer of propylene having a molecular weight between about 200 and 12,000. The novel oxidized polypropylene is an ester having an oxygen content between 2 and 50%, preferably 5 to 25% by weight. This polyester has been shown to be particularly useful as a plasticizer for different resinous or rubbery plastics, particularly for polyvinyl-type resins, with which it can be readily compounded at elevated temperatures ranging from 260° F. to 335° F. The new oxidized product also is useful as a plasticizer for nitrocellulose, or lacquers thereof, cellulose acetate, cellulose ethers, resin coatings, chlorinated wax; or the oxidized polymer can be used as an oil additive either in its unchanged form or after hydrogenation or chlorination or other chemical modification such as phosphorus pentasulfide treatment. Still other modifications of the present invention will readily occur to persons skilled in the art, and it is to be understood that the specific embodiments have been described hereinabove solely for purposes of illustration and are not to be construed as limitations of the invention defined in the appended claims.

We claim:

1. A process comprising adding 0.3 to 5% of a hydrocarbon soluble peroxide to a polypropylene oil having a molecular weight between 300 and 5,000, bubbling an oxygen-containing gas therethrough at a temperature between 140° C. and 185° C., until the combined oxygen content of the polypropylene oil reaches 5 to 25% and recovering the oxidized polypropylene.

2. A process according to claim 1 wherein the peroxide is cumene hydroperoxide.

3. A process according to claim 2 wherein the oxidation temperature is between 140 and 150° C.

4. An oxidized polypropylene oil prepared by the process of claim 1.

5. An oxidized polypropylene oil prepared by the process of claim 2.

6. An oxidized polypropylene oil prepared by the process of claim 3.

LOUIS A. MIKESKA.
DAVID W. YOUNG.

REFERENCES CITED

The following references are of record in the file of this patent:

UNITED STATES PATENTS

| Number | Name | Date |
| --- | --- | --- |
| 2,128,574 | Van Peski | Aug. 30, 1938 |
| 2,327,212 | Patnode | Aug. 17, 1943 |
| 2,385,290 | Lichty | Sept. 18, 1945 |
| 2,390,918 | Bruson | Dec. 11, 1945 |
| 2,471,520 | Fleming | May 31, 1949 |